United States Patent [19]

Gerth

[11] Patent Number: 5,357,555
[45] Date of Patent: Oct. 18, 1994

[54] METHOD FOR THE OPERATION OF AN X-RAY INSTALLATION HAVING AN X-RAY RADIATOR

[75] Inventor: Heinz Gerth, Nurenberg, Fed. Rep. of Germany

[73] Assignee: Siemens Aktiengesellschaft, Munich, Fed. Rep. of Germany

[21] Appl. No.: 84,137

[22] Filed: Jul. 1, 1993

[30] Foreign Application Priority Data

Jul. 30, 1992 [DE] Fed. Rep. of Germany ....... 4225221

[51] Int. Cl.⁵ .............................................. H01J 35/10
[52] U.S. Cl. .................................... 378/200; 378/199; 378/202
[58] Field of Search ............... 378/127, 130, 141, 199, 378/200, 201, 202

[56] References Cited

U.S. PATENT DOCUMENTS

| | | |
|---|---|---|
| 4,767,961 | 8/1988 | Koller et al. ................... 378/130 X |
| 4,768,212 | 8/1988 | Appelt et al. . |
| 5,086,449 | 2/1992 | Furbee et al. . |
| 5,222,118 | 6/1993 | Gerth . |

FOREIGN PATENT DOCUMENTS 62-274599  11/1987  Japan .

*Primary Examiner*—David P. Porta
*Attorney, Agent, or Firm*—Hill, Steadman & Simpson

[57] ABSTRACT

The invention is directed to a method for operating an x-ray installation having an x-ray radiator, which comprises an x-ray tube accepted in a housing filled with an electrically insulating liquid. The electrically insulating liquid is thereby degasified at intervals in order to prevent gases arising as a consequence of the decomposition of the electrically insulating liquid caused by the generated x-ray radiation from deteriorating the high-voltage strength of the x-ray radiator.

10 Claims, 1 Drawing Sheet

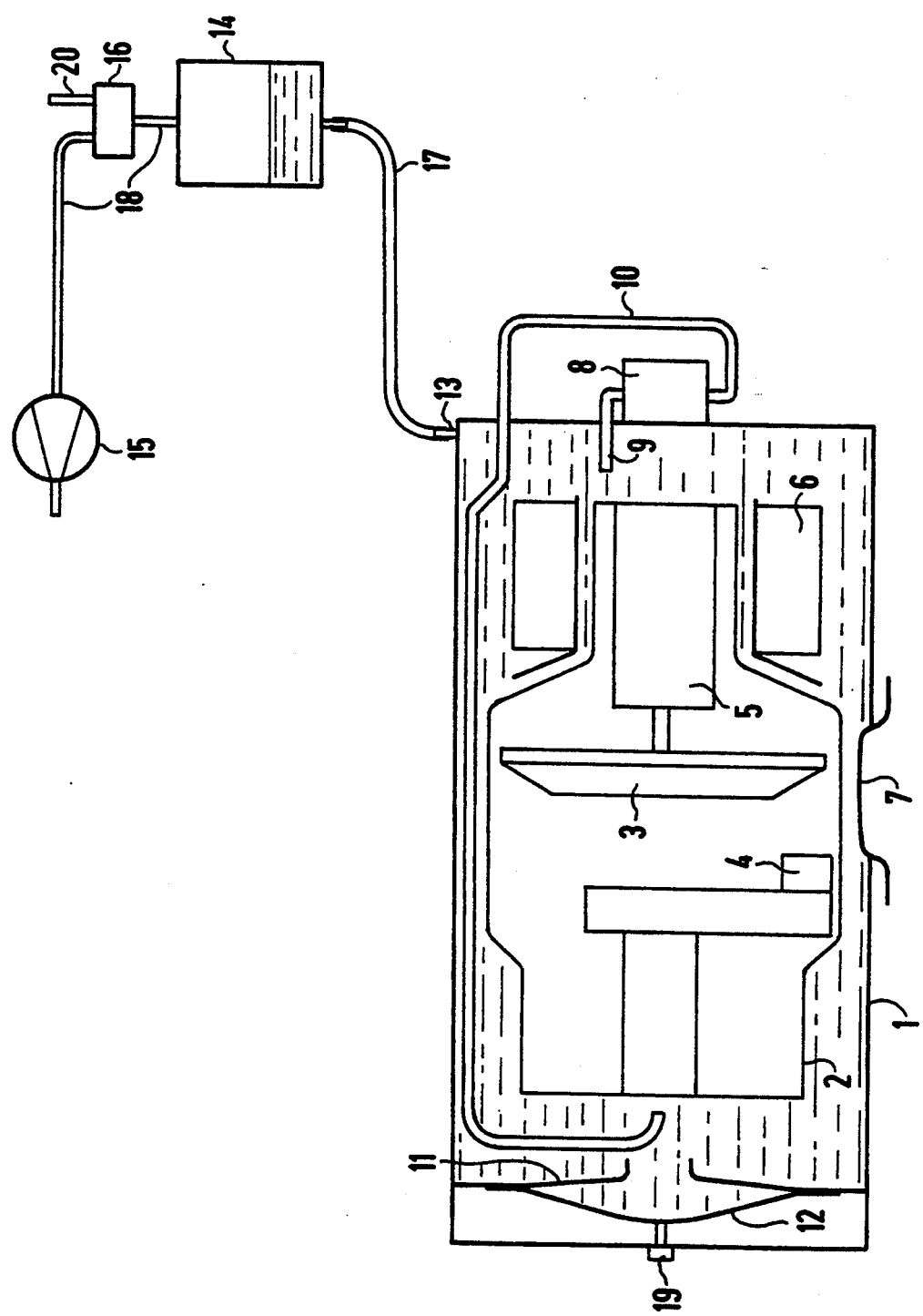

METHOD FOR THE OPERATION OF AN X-RAY INSTALLATION HAVING AN X-RAY RADIATOR

BACKGROUND OF THE INVENTION

The invention is directed to a method for the operation of an x-ray installation having an x-ray radiator, which comprises an x-ray tube within a liquid-filled housing.

The problem arises in such x-ray installations, whose x-ray radiators usually contain an electrically insulating liquid, namely an insulating oil, that the oil decomposes under the influence of the x-radiation. As a result thereof, gases, including hydrogen, are released, these first entering into solution in the oil and appearing in the form of gas bubbles after saturation has been reached. The occurrence of gas bubbles is disadvantageous, first, because the obtainable image quality suffers when employing the x-ray installation for imaging purposes when gas bubbles are located in the region of the useful x-ray beam. Second, the insulating effect is reduced due to the presence of gas bubbles in the insulating oil, so that the risk of voltage arc-overs and, thus, of the outage of the x-ray radiator is present.

German Patent 892 032 and DE-UM 17 11 479 disclose x-ray radiators with an x-ray tube located in a liquid-filled housing wherein measures are undertaken with which gas bubbles present in the liquid in the region of the x-ray tube are to be eliminated. These measures, however, can only be undertaken when larger gas bubbles have already formed. They are ultimately ineffective in view of the afore-mentioned disadvantages.

SUMMARY OF THE INVENTION

The object of the invention is to specify a method for operating an x-ray system having an X-ray tube within a liquid-filled housing that at least alleviates the disadvantageous effects of the decomposition of the liquid contained in the x-ray radiator due to the influence of x-radiation.

This object is inventively achieved in that the liquid is degasified at time intervals. The duration of the intervals is selected such that a degasification is accomplished before gas bubbles have formed; or, the degasification ensues before gas bubbles have collected in the liquid to a harmful extent. In this context the duration of the intervals may be selected dependent on the operating duration of the x-ray radiator and/or on the radiation dose that has been output. The intervals preferably coincide with the maintenance intervals of the x-ray installation. In this case, it is advantageous that no additional maintenance costs arise, since the maintenance of the x-ray system and the degasification of the x-ray radiator ensue simultaneously. For implementing the degasification, the maintenance technician must thereby merely connect a degasification system to the x-ray radiator.

When a circulating pump for the liquid is provided, a version of the invention provides that the liquid is at least partially, i.e. part of the time, circulated during the degasification.

According to a version of the invention, the method is implemented with the assistance of a degasification means connectable to the x-ray radiator, this means comprising a degasification vessel that is partially filled with liquid during the degasification. According to the procedure of the invention, the volume situated above the liquid level in the degasification vessel is multiply charged with under-pressure (i.e., subjected to a vacuum) and is respectively subsequently connected to the surrounding atmosphere. An especially effective degasification is effected in this way.

BRIEF DESCRIPTION OF THE DRAWINGS

The FIGURE is a schematic drawing of the present invention.

DETAILED DESCRIPTION OF THE PREFERRED EMBODIMENTS

The sole figure of the drawing illustrates an x-ray radiator an x-ray installation. The x-ray radiator comprises a protective housing 1 filled with an electrically insulating liquid, for example insulating oil, wherein an x-ray tube 2 is arranged. The latter is fashioned in a known way as a rotating anode x-ray tube that contains an anode dish 3, a cathode 4 and a motor for driving the rotating anode, this motor comprising a rotor 5 and a stator 6 arranged outside the vacuum housing of the x-ray tube 2. The protective housing 1 is provided for a beam exit window 7 for the x-ray radiation emanating from the anode dish 3. The voltage supply required for the operation of the x-ray tube and the connections between the voltage supply and the x-ray tube 2 are not shown.

A circulating pump 8 for circulating the insulating oil is provided. The oil not only serves insulating purposes but also eliminates the dissipated heat output of the x-ray tube 2. The pump 8 circulates the oil through lines 9, 10.

A transverse wall 11 is provided within the protective housing 1. A resilient membrane 12 closes the interior of the protective housing 1 liquid-tight and serves the purpose of absorbing temperature-caused volume fluctuations of the insulating oil. The membrane 12 is attached to this transverse wall 11.

As a consequence of the insulating oil situated in the protective housing 1 being charged with x-radiation during operation of the x-ray radiator, the insulating oil gradually decomposes, this ultimately leading to the formation of gas bubbles, particularly hydrogen bubbles. In order to prevent disadvantageous effects of the gas bubbles on the high-voltage strength of the x-ray radiator and on the obtainable image quality as well in the case of x-ray diagnostics installations, it is inventively provided that the insulating oil situated in the x-ray radiator is degasified at intervals.

In order to be able to connect the degasification means required for this purpose to the x-ray radiator, the protective housing 1 of the latter is provided with a corresponding connecting branch 13. The latter can be fashioned such that it is closed liquid-tight with a screw plug during normal operation, this being removed for the implementation of the degasification. The connecting branch 13, however, can also be implemented such that it comprises a valve (not shown) that is closed during normal operation and can be opened for degasification.

As its most important component parts, the degasification means comprises a degasification vessel 14, a vacuum pump 15 and a valve 16.

The degasification 14 comprises an upper and a lower connection. The degasification vessel has its lower connection 14a connected via a line 17, for example a suitable hose, to the connecting branch 13. It is critical that enough insulating oil is present in the degasification vessel 14 that a liquid level forms under the upper connection 14b. The upper connection of the degasification vessel 14 is connected via a suitable line 18 to the vacuum pump 15. The valve 16 is inserted into the line 18, this valve 16 being fashioned such that the space situated above the liquid level in the degasification vessel 14 can be optionally connected to the vacuum pump or to the surrounding atmosphere via an aeration nozzle 20.

In order to assure that the degasification process has no influence on the quantity of insulating oil located in the x-ray radiator, the membrane 12 may be fixed in position, this being illustrated in the figure by a schematically indicated membrane block 19 that is attached before the beginning of the degasification process and is in turn removed after the conclusion thereof.

For degasifying the insulating oil the procedure is as follows. First, the degasification means is connected to the x-ray radiator with the line 17 and it is assured that a liquid-conducting connection is present between the interior of the protective housing 1 and the degasification vessel 14. Subsequently, care is exercised to see that a quantity of insulating oil adequate for the formation of a liquid level is contained in the degasification vessel 14. Following thereupon, the valve 16 is brought into that position wherein the space of the degasification vessel 14 situated above the liquid level is connected to the vacuum pump 15 and the latter is actuated. *) Potential gas bubbles situated in the insulating oil are now suctioned off. In addition, a degasification of the insulating oil also occurs to the affect that gases dissolved in the insulating oil are removed. To this end, however, it is necessary that the pressure in the degasification vessel 14 is lowered to such an extent with the vacuum pump 15 that it lies below the partial gas pressures of the gases to be eliminated from the insulating oil.

*) whereby the volume in the degasification vessel 14 is charged with under-pressure, i.e. partial vacuum or a pressure below the atmospheric pressure.

After a certain time, an equilibrium would be established to the affect that partial gas pressures that are equal to the partial gas pressures of the corresponding gases in the liquid are present with respect to the gases to be eliminated as a consequence of the gases released from the insulating oil located in the degasification vessel above the liquid level, so that no further degasification of the liquid could occur. In order to prevent this, the valve 16 is actuated from time to time such that the interior of the degasification vessel 14 is aerated, so that renewed degasification is subsequently possible when the valve 16 is returned into its original position. Moreover, a respectively brief-duration aeration is adequate.

The extraction of gas bubbles as well as the degasification of the insulating oil can be enhanced in that the circulating pump 8 is at least activated at times during the degasification process.

After the end of the degasification process, the degasification device is separated from the connecting branch 13, which is again sealed liquid-tight. The membrane block 19 is also removed. The x-ray radiator can now be placed back into operation.

The degasification of the insulating oil preferably ensues at intervals that correspond to the maintenance intervals of the x-ray systems, so that no additional service costs arise.

In order to make it possible for the service personnel to pursue other maintenance jobs at the x-ray system during the degasification process, it can be provided (in a way that is not shown) that a control automatically actuates the vacuum pump 15, the valve 16 and the circulating pump 8 in the way set forth for the implementation of the degasification process. The x-ray radiator can have a terminal in this case that makes it possible for the degasification means to actuate the circulating pump 8. When such a control is provided, the activity of the maintenance personnel that arises in conjunction with the degasification is thus restricted to connecting the degasification means to the x-ray radiator, to potentially blocking the membrane 12, placing the degasification means in operation and separating it in turn from the x-ray radiator after the end of the degasification and in turn potentially removing the blocking of the membrane 12.

The method of the invention can also be employed in x-ray radiators whose x-ray tubes comprise a stationary anode. Further, the method of the invention can also be employed in x-ray radiators that contain a fluid other than insulating oil.

Although the present invention has been described with reference to a specific embodiment, those of skill in the art will recognize that changes may be made thereto without departing from the scope and spirit of the invention as set forth in the appended claims.

I claim as my invention:

1. A method for the operation of an x-ray installation having an x-ray radiator, which comprises an x-ray tube located in a liquid-filled housing comprising the step of:
    degasifying the liquid at intervals wherein said x-ray radiator is not operating.

2. A method according to claim 1, wherein the step of degasifying is further characterized in that the intervals are the maintenance intervals of the x-ray system.

3. A method according to claim 1, comprising the further steps of:
    providing a circulating pump for the liquid; and
    at least partially circulating the liquid with the circulating pump during the degasification.

4. A method according to claim 1, comprising the further steps of:
    providing a degasification means comprising a degasification vessel that is at least partially filled with liquid;
    connecting the degasification vessel to the x-ray radiator with a line such that the liquid volume situated in the degasification vessel is connected to the liquid-filled housing;
    connecting an under-pressure source to the degasification vessel such that the volume situated in the degasification vessel above the liquid level can be charged with under-pressure; and
    multiply charging the volume situated in the degasification vessel above the liquid level with under-pressure; and
    alternately connecting the volume situated in the degasification vessel above the liquid level to the surrounding atmosphere.

5. An apparatus for degasifying the liquid which electrically insulates an x-ray tube located within a surrounding wall of a liquid holding housing, comprising:
    a degasification vessel having a top port and a bottom port, said bottom port flow connected to said housing;
    a three-way valve having a first port connected to said top port, and a second port and a third port, said third port flow connected to atmosphere, said valve alternately flow connecting said first port to said second port or said first port to said third port; a vacuum source flow connected to said second port.

6. An apparatus according to claim 5 further comprising a liquid circulating pump for circulating liquid held within said housing.

7. An apparatus according to claim 5 further comprising a movable membrane forming part of said surrounding wall of said liquid holding housing; and
   a membrane block for preventing movement of said membrane during liquid degasifying.

8. A method for the operation of an x-ray installation having an x-ray radiator, which comprises an x-ray tube located in a liquid-filled housing, comprising the steps of:
   providing a degasification means connected to said liquid-filled housing; and
   degasifying the liquid at intervals during which said x-ray radiator is not operating by operating the degasification means.

9. A method according to claim 8, comprising the further steps of:
   providing a circulating pump for the liquid; and
   at least partially circulating the liquid with the circulating pump during the degasification.

10. A method according to claim 8, comprising the further steps of:
   providing a degasification means comprising a degasification vessel that is at least partially filled with liquid;
   connecting the degasification vessel to the x-ray radiator with a line such that the liquid volume situated in the degasification vessel is connected to the liquid-filled housing;
   connecting an under-pressure source to the degasification vessel such that the volume situated in the degasification vessel above the liquid level can be charged under-pressure; and
   multiply charging the volume situated in the degasification vessel above the liquid level with under-pressure; and
   alternately connecting the volume situated in the degasification vessel above the liquid level to the surrounding atmosphere.

* * * * *